United States Patent [19]

Peller et al.

[11] Patent Number: 4,903,917
[45] Date of Patent: Feb. 27, 1990

[54] PROJECTILE WITH ROTATABLE STABILIZING DEVICE

[75] Inventors: Helmut Peller, Düsseldorf; Hartmut Schilling, Kaarst; Hanjoerg Becker; Gerhard Glotz, both of Düsseldorf, all of Fed. Rep. of Germany

[73] Assignee: Rheinmetall GmbH, Düsseldorf, Fed. Rep. of Germany

[21] Appl. No.: 86,460

[22] Filed: Aug. 18, 1987

[30] Foreign Application Priority Data

Aug. 19, 1986 [DE] Fed. Rep. of Germany ....... 3628129

[51] Int. Cl.[4] ........................................ F42B 15/053
[52] U.S. Cl. .................. 244/3.21; 244/3.27; 244/3.28; 244/21; 244/39
[58] Field of Search .......... 244/3.1, 3.21, 3.23, 244/3.24, 3.27, 3.28, 3.29, 10, 39, 21

[56] References Cited

U.S. PATENT DOCUMENTS

| 1,927,538 | 9/1933 | Zaparka | 244/21 |
| 2,065,254 | 12/1936 | Wander | 244/21 |
| 2,344,515 | 3/1944 | Massey | 244/21 |
| 2,681,775 | 6/1954 | Orazi | 244/39 |
| 2,922,600 | 1/1960 | Craft | 244/3.21 |
| 3,140,065 | 7/1964 | Alvarez-Calderon | 244/21 |
| 3,305,194 | 2/1967 | Conrad et al. | 244/3.21 |
| 3,568,961 | 3/1971 | Iversen | 244/23 |
| 4,667,899 | 5/1987 | Wedertz | 244/3.27 |
| 4,709,877 | 12/1987 | Goulding | 244/3.28 |

FOREIGN PATENT DOCUMENTS

| 723542 | 4/1932 | France . | |
| 17981 | 2/1917 | United Kingdom | 244/21 |
| 245134 | 2/1927 | United Kingdom | 244/21 |
| 424140 | 2/1935 | United Kingdom . | |
| 1036033 | 7/1966 | United Kingdom . | |

Primary Examiner—Deborah L. Kyle
Assistant Examiner—Michael J. Carone
Attorney, Agent, or Firm—Spencer & Frank

[57] ABSTRACT

The invention is concerned with a projectile with a stabilizing device that is depolyable beyond the caliber and that should at least comprise an object rotatable about its axis. The stabilizing device can be telescopically arranged and can have a cover that is shaped to conform to the surface of the projectile when the device is not deployed.

10 Claims, 1 Drawing Sheet

PROJECTILE WITH ROTATABLE STABILIZING DEVICE

BACKGROUND OF THE INVENTION

1. Field of the Invention

The invention concerns a projectile with a stabilizing device deployable beyond the caliber.

2. Discussion of the Prior Art

A projectile with a stabilizing device deployable beyond the projectile caliber is known from U.S. Pat. No. 3,188,957. This projectile shows at its stern an exposable fin ring stabilizer, which is fashioned so that it lies within the caliber before exposure. The fin ring stabilizer provided in this device allows for improved aerodynamics and force distribution over other prior art devices.

It is a disadvantage of this design that the stabilizing device is largely static after deployment, which means that the lateral forces for guidance and twist regulation of the projectile are only minimal.

A similar evaluation also results regarding the twist-stabilized projectile known from German Offenlegungsschrift (non-examined published application No.) 20 18 881, which is equipped with blades with axial flow-through. Even if they could be movably and/or elastically arranged, the blades can offer a possibility of control of lateral forces within certain limits only by changing their angle of attack.

The present invention is based on the need to build a projectile so that large, optionally adjustable lateral forces can be produced for guidance and twist regulation.

The invention is based on the knowledge that the opportunities for stabilization of a projectile can be increased significantly by the use of movable and especially rotatable components. In prior art devices, regulation by fins, blades or similar devices is only possible within given limits predetermined by construction. On the other hand, with rotating elements basically any reaction force can be set, and these are preferably are adjustable in their length and/or orientation.

SUMMARY OF THE INVENTION

It is an object of the present invention to provide a device that makes it possible to create almost any lateral force on the projectile.

It is a further object of the invention to provide a device that can regulate lateral forces and twist of the projectile.

It is still a further object of the invention to provide a stabilizing device that will be very small relative to the overall size of the projectile.

The above and other objects are generally accomplished by the present invention according to which, briefly stated, a stabilizing device deployable beyond the caliber of the projectile comprises at least one cylinder rotatable about its longitudinal axis.

The term "cylinder" is not restricted here to round and rotationally symmetrical cylinders but is intended to encompass all rod- or cone-like components.

The preferred "cylinder" on the basis of simplified aerodynamic calculations are rotationally symmetrical cylinders. These rotationally symmetrical cylinders can be of different geometrical configurations as will be explained in more detail below.

Such a cylinder is preferably adjustably arranged in and out of the caliber which makes it possible to create almost any lateral forces given its geometrical configuration, length (path of excursion) and especially its speed of rotation.

The corresponding possibilities for variation are considerably increased if several cylinders are arranged about the periphery of the projectile wherein the cylinders are arranged at equal distance and with their longitudinal axes at an angle to the projectile surface.

The cylinders can also be designed totally differently from one another.

For example, they can differ in the profile of their surface. Thus one cylinder can be formed with a longitudinally or transversely grooved surface whereas another can be formed like a fin wheel on its surface. Further domed or constricted surface patterns of the cylinders can be utilized. The present invention does not set any limits in the invention concerning the configurational details of the surface.

Through different diameters and length of excursion paths out of from the projectile, a further opportunity for variation is provided for regulation of the lateral forces and twist of the projectile.

Preferably the individual cylinders (for example, four distributed evenly about the periphery of the projectile) are guided by a device in the projectile. This device can provide, with corresponding programming, that one cylinder remains within the caliber while the other three (for example, each with different profiles) are pushed out to different lengths and then rotate with different speeds of rotation.

Regarding the arrangement of the individual cylinders, the invention contemplates that these can be arranged in a hinged fashion as well as being driven out telescopically.

In the case of an arrangement that is movable in the caliber, it is possible to orient the cylinders, relative to the longitudinal axis of the projectile, in a range of angles between zero and ninety degrees whereby further regulation opportunities exist.

In another advantageous form of the invention, the cylinders are supplied at their free outer end with a cover exceeding the diameter of the cylinder. Different coverings can be arranged on the sam projectile with different cylinders.

In addition the invention provides especially at the stern stabilizing wings fins, particularly wound-about fins, from which further overall stabilization of th projectile results.

The stabilizing feature according to the invention makes it possible to produce projectiles of almost any length and thus they have a greater ballistic coefficient, range, and penetration power. The present invention is also independent of caliber.

Because of the relatively small surfaces projecting beyond the caliber, a small roll-damping torque is created along with simultaneous creation of very high lateral forces which can be very precisely adjusted.

The stabilizing device is very small relative to the overall size of the projectile. In contrast to the use of stabilizing fins, the lateral force produced is almost unlimited because a flow separation (at large angles of attack) cannot occur. In comparison to impulse-guided stabilizing devices intermittent stresses are avoided, which could have a negative influence on the regulating loop (the seeker head).

DESCRIPTION OF THE PREFERRED EMBODIMENTS

Figure 1:
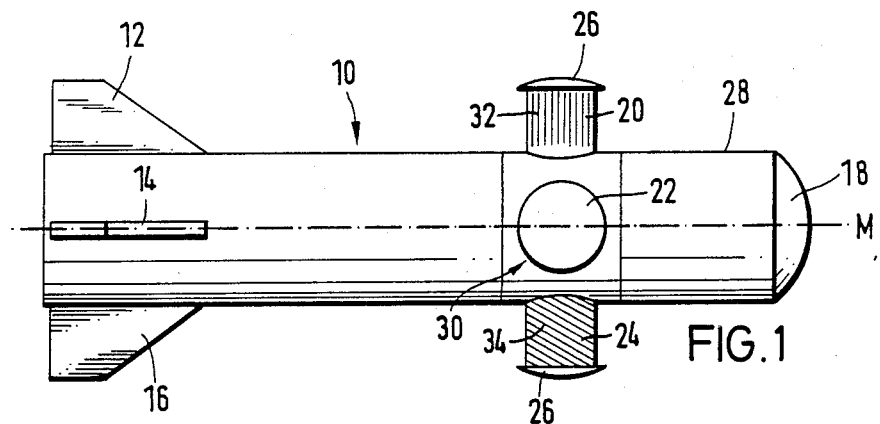
FIGS. 1, 2 and 3 are schematic side elevational views of several preferred embodiments of the invention.

The apparatus shown in the drawings serves to illustrate projectile with various types of stabilizing devices attached thereto.

The projectile 10 according to FIG. 1 shows at its back end, symmetrically arranged on the peripheral area, four deployable fins 12, 14, 16, for stabilization (only three of the four fins are shown).

In the front part of the projectile and at some distance to the nose 18, four circular cylinders are arranged in the same fashion as the fins 12, 14, 16 in radial orientation relative to the longitudinal axis M of the projectile 10. The three visible cylinders are designated at 20, 22, 24.

Figure 2:
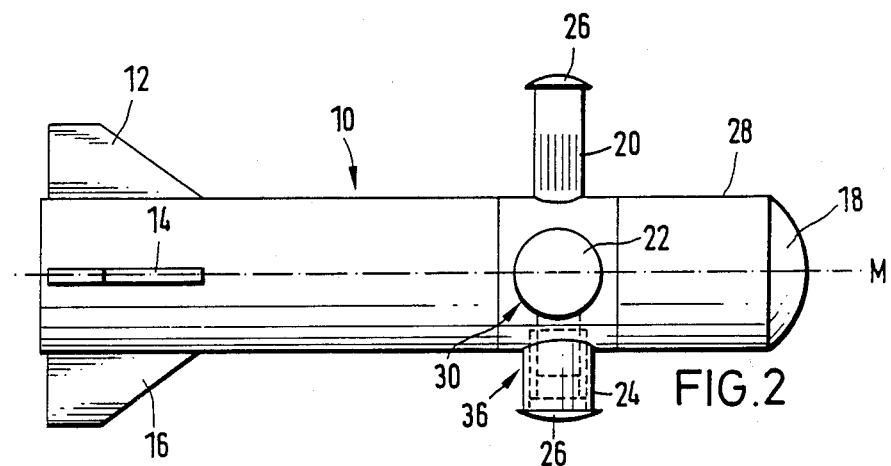

Each cylinder can be driven telescopically out of the interior of the projectile 10 as is shown schematically for the cylinder 24 in FIG. 2. At the cylinder's free end, a disc 26 exceeding the diameter of the cylinder is formed in a domed fashion corresponding to the curvature of the projectile surface 10.

In the completely retracted position the discs 26 merge completely into the surface 28 of the projectile 10.

The displacement of the cylinders 20, 22, 24 is accomplished by the driving and positioning motors supplied with a guidance device 30 in the interior of the projectile 10. The motors also provide for the rotatory mobility of the cylinders 20, 22, 24 whereby each of the four cylinders can be set individually.

The surfaces of the cylinders 20, 22, 24 have different structures. Cylinder 22 is, constricted at midlength and circular cylinder 20 has superficial grooves 32 extending parallel to its longitudinal axis. The surface of cylinder 24 is formed like a worm shaft with transversely extending depressions 34.

The embodiment of the projectile illustrated in FIG. 2 differs from that in FIG. 1 in that the outwardly projecting cylinder 20 has smaller diameter than cylinders 22, 24 and has axially extending superficial grooves only in its lower portion. The cylinder 20 is movable telescopically in the projectile 10 in the same way as the cylinder 24 is movable telescopically via the telescoping device 36.

Figure 3:
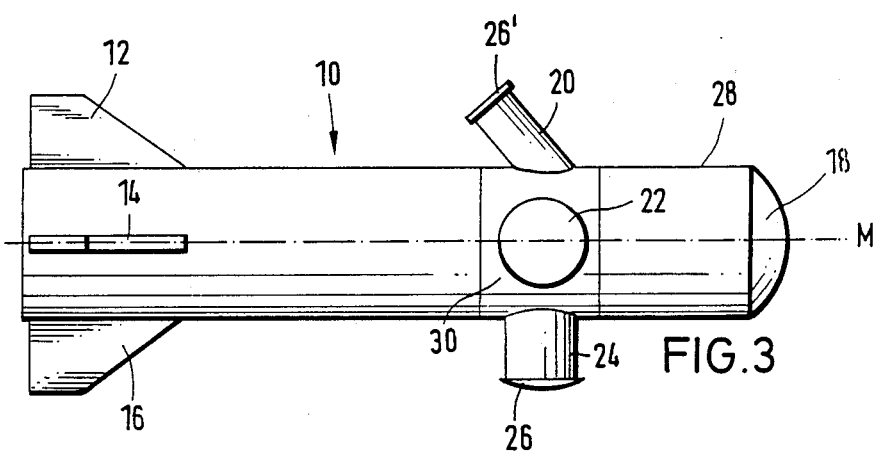

In the embodiment according to FIG. 3, the upper cylinder 20 is not only movable telescopically out of the projectile 10 but is also hingably arranged for movement between 0 and 90 degrees relative to the longitudinal axis M. This means that the cylinder can be folded rearwardly from the position according to FIG. 1 or 2 into the projectile 10. In FIG. 3 an intermediate position of the cylinder with an angle of about 50 degrees to the longitudinal axis is illustrated.

The hinged cylinder 20 has a cylindrical upper cover disc 26' which differs from the previously described domed cover 26.

In the description which follows, the significance and effect of the rotation of the cylinders according to the invention will be set forth.

In every rotating body, preferably some type of cylinder, which is in an incident flow by air from one direction, transverse forces occur perpendicular to the axis of rotation and to the direction of incident flow according to the "Magnus effect." For example, a spin imparted to a soccer ball or a tennis ball will significantly influence their flight path.

It is possible to utilize this effect by providing only one cylinder for the guidance of the projectile, in particular for the adjustment of a unilaterally curved flight path or for the stabilization of the rolling movement.

The arrangement of two cylinders opposite to each other on the projectile and rotating in the same sense, serves preferably for effecting a pitch and lift movement of the projectile whereas a stabilization of the rolling movement can be achieved through a rotation of the cylinders in an opposite sense.

An arrangement of four cylinders, which are equidistantly arranged about the periphery of the projectile, serves preferably for the guidance in side and height direction.

The guidance unit 30 contains known propulsion and adjustment units for the creation of the rotation, for the telescope-like extension, and the folding-out of the cylinders.

The invention primarily documents the arrangement of one or more cylinders in different embodiments for the desired adjustment of side forces for the protection of guidance and spiral movements in a flying object, particularly a projectile. The side forces can only be exerted on these cylinders, when the cylinders are extended so that cylinders still within the projectile cannot produce guidance and spiral movements. In particular, the cylinders can only by their rotation achieve a sufficient effect on the guidance and spiral movement adjustment of the projectile.

The speed of rotation of the cylinder can be different; it is mainly dependent on the incident flow velocity. For a reliable guidance of the projectile and transfer of spiral movements, the ratio of circumferential speed of the cylinder to incident flow velocity should not exceed 5.

The present disclosure relates to the subject matter disclosed in German P No. 36 28 129.8 of Aug. 19, 1986, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. A projectile having a predetermined caliber, comprising a stabilizing device including a plurality of cylinders each having a longitudinal axis; said cylinders being arranged equidistantly about the periphery of the projectile; the respective longitudinal axes of the cylinders lying in a common radial plane of the projectile; each cylinder having a different diameter, a different surface profile, a different length and a different exterior shape; said cylinders having a withdrawn position in which they are situated within the confines of the projectile caliber and a deployed position in which they project beyond the projectile caliber; said cylinders being movable from one of said positions into the other.

2. A projectile according to claim 1, wherein each said longitudinal axis is perpendicular to a longitudinal axis of said projectile in said deployed position.

3. A projectile according to claim 1, each said cylinder further including a free end and a cover, wherein each said cover exceeds the diameter of the respective cylinder and is disposed on said free end thereof.

4. A projectile as defined in claim 1, wherein said cylinders are pivotal from one of said positions into the other.

5. A projectile as defined in claim 1, wherein said cylinders are telescopically movable from one of said positions into the other.

6. A projectile as defined in claim 1, wherein at least one of said cylinders has a longitudinally grooved surface.

7. A projectile as defined in claim 1, wherein at least one of said cylinders has a transversely grooved surface.

8. A projectile as defined in claim 1, wherein at least one of said cylinders has a domed surface.

9. A projectile as defined in claim 1, further comprising a guidance device disposed in an interior of the projectile and surrounded by said cylinders; said cylinders being individually adjustable by said guidance device.

10. A projectile as defined in claim 1, further comprising means for imparting a rotation to said cylinders about the longitudinal axis thereof.

* * * * *